(12) United States Patent
Niizaka et al.

(10) Patent No.: US 11,002,690 B2
(45) Date of Patent: May 11, 2021

(54) X-RAY CT DEVICE

(71) Applicant: Shimadzu Corporation, Kyoto (JP)

(72) Inventors: Takuma Niizaka, Kyoto (JP);
Yasuyuki Keyaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/605,551

(22) PCT Filed: Jul. 3, 2017

(86) PCT No.: PCT/JP2017/024319
§ 371 (c)(1),
(2) Date: Oct. 16, 2019

(87) PCT Pub. No.: WO2019/008620
PCT Pub. Date: Jan. 10, 2019

(65) Prior Publication Data
US 2020/0124545 A1 Apr. 23, 2020

(51) Int. Cl.
*G01N 23/00* (2006.01)
*G01N 23/046* (2018.01)

(52) U.S. Cl.
CPC ..... *G01N 23/046* (2013.01); *G01N 2223/401* (2013.01)

(58) Field of Classification Search
CPC ........... G01N 2223/401; G01N 23/046; G01N 15/1475; G01N 2015/1006;
(Continued)

(56) References Cited

U.S. PATENT DOCUMENTS 6,196,715 B1 3/2001 Nambu et al.
6,243,439 B1 6/2001 Arai et al.
(Continued)

FOREIGN PATENT DOCUMENTS

EP 1579806 A1 9/2005
JP 1998295680 A 11/1998
(Continued)

OTHER PUBLICATIONS

Voegler et al., "Positional Stability of 2D X-ray Images for Computer Tomography," International Symposium on Digital Industrial Radiology and Computed Tomography—Mo.3.3 (2011).
(Continued)

*Primary Examiner* — Irakli Kiknadze
(74) *Attorney, Agent, or Firm* — Muir Patent Law, PLLC

(57) ABSTRACT

Between an X-ray source and a rotating stage 13, a marker member including a flat plate 21 formed with markers M and a support part 22 supporting the flat plate 21 is arranged. The formation positions of the markers M on the flat plate 21 are set to positions that allow the distance between the markers M to be most separated in an area in which both of the markers M are not superimposed on a projection image of a subject within the detection range of an X-ray detector 12 and that is constantly included within the detection range even when an X-ray focal point is moved. Also, the length of the support part 22 is adjusted to a length resulting in a side end of the detection range of the X-ray detector where the flat plate 21 and the markers M are not superimposed on the subject W on a projection image.

15 Claims, 4 Drawing Sheets

(58) Field of Classification Search
CPC ......... G01N 2223/419; G01N 33/5091; G01N 33/574; G01N 23/044; A61B 6/032; A61B 6/04; A61B 6/4021; A61B 6/4233; A61B 6/4291; A61B 6/466; A61B 6/5258; A61B 6/547; A61B 5/0205; A61B 5/02116; A61B 5/02125; A61B 5/02405; A61B 5/0402; A61B 5/04025; A61B 5/0476; A61B 5/0484; A61B 5/0488; A61B 5/0496; A61B 5/08; A61B 5/14542; A61B 6/583; A61B 6/587; A61B 6/584; G01T 1/2985; G01T 7/005; G01T 1/02; G01T 1/169; G01T 1/29; G01T 7/00; G01V 5/005; G03B 42/02; G06K 9/00127; G06K 2009/3225; G06K 9/3216; G06T 2207/10152; G06T 2207/30024; G06T 7/0012; G06T 2207/10081; G06T 11/005; G06T 11/006; G06T 2207/30036; G06T 2207/30196; G06T 2211/436; G06T 2207/30204; G06T 2207/30004; G06T 3/0068; G06T 7/74; G06T 2211/421; G06T 17/20; G06T 2207/10004; G06T 2207/10024; G06T 2207/10052; G06T 2207/20221; G06T 7/337; G06F 1/266; G06F 1/3296; H02J 9/005; A61M 5/172; A61M 19/00; A61M 2005/006; A61M 5/3298; A61N 1/0529; A61N 5/1049; A61N 2005/1061; A61N 5/1082; A61N 1/0534; A61N 1/36185; A61N 1/37235; A61N 1/37241; A61N 1/37247; A61N 5/10; A61N 2005/1059; A61N 2005/1097; A61N 5/1037; A61N 5/1067; A61N 5/1069; A61N 5/1038; A61N 5/1065; A61N 2007/0008; A61N 7/02; A61N 2007/0095; A61N 1/06; A61N 7/022; G01J 1/0266; H04N 13/122; H04N 13/204; H04N 13/239; H04N 13/254; H04N 13/271; H04N 17/002; H04N 2013/0074; H04N 5/3572; H04N 9/04515; H04N 9/04517; G10K 11/28; G16H 30/40; G05B 15/02
USPC .......................................... 378/4, 19, 20, 62
See application file for complete search history.

(56) References Cited

U.S. PATENT DOCUMENTS

| | | | | |
|---|---|---|---|---|
| 6,771,734 | B2* | 8/2004 | Hebecker | A61B 6/4405 |
| | | | | 378/8 |
| 6,960,020 | B2* | 11/2005 | Lai | A61B 6/025 |
| | | | | 378/207 |
| 9,044,190 | B2* | 6/2015 | Rubner | A61B 6/583 |
| 9,693,748 | B2* | 7/2017 | Rai | A61B 6/487 |
| 2005/0254619 | A1 | 11/2005 | Kamegawa | |
| 2006/0115054 | A1* | 6/2006 | Yatsenko | A61B 6/547 |
| | | | | 378/207 |
| 2008/0085489 | A1* | 4/2008 | Schmitt | G16H 50/50 |
| | | | | 433/75 |
| 2011/0190787 | A1* | 8/2011 | Sahni | A61B 90/11 |
| | | | | 606/130 |
| 2013/0114799 | A1* | 5/2013 | Yamakawa | A61B 6/14 |
| | | | | 378/207 |
| 2014/0283385 | A1 | 9/2014 | Watanabe | |
| 2015/0173847 | A1 | 6/2015 | Hayashi et al. | |

FOREIGN PATENT DOCUMENTS

| | | |
|---|---|---|
| JP | 2000298105 A | 10/2000 |
| JP | 2002-333408 A | 11/2002 |
| JP | 2004-340630 A | 12/2004 |
| JP | 2005-270297 A | 10/2005 |
| JP | 2005351879 A | 12/2005 |
| JP | 3743594 B2 | 2/2006 |
| JP | 2013233267 A | 11/2013 |
| JP | 5850059 B2 | 12/2015 |
| JP | 2015232453 A | 12/2015 |
| JP | 2017-086816 A | 5/2017 |
| WO | 2009036983 A1 | 3/2009 |

OTHER PUBLICATIONS

Written Opinion of the International Search Authority (PCT/ISA/237), for PCT application PCT/JP2017/024319, submitted with a machine translation.

European Search Report dated Jul. 20, 2020 for the corresponding European Patent Application No. 17917158.2.

First Office Action dated Oct. 13, 2020 for the corresponding Japanese Patent Application No. 2019-528189 with its machine translation.

* cited by examiner

X-RAY CT DEVICE

TECHNICAL FIELD

The present invention relates to an X-ray CT device that non-destructively observes the internal structures of various products and measures the three-dimensional shapes of the various products.

BACKGROUND ART

An industrial X-ray CT device is one that three-dimensionally observes the internal structure of a subject such as an industrial product by, between an X-ray source and an X-ray detector that are mutually oppositely arranged, arranging a rotating stage on which the subject is placed, and collecting pieces of X-ray projection data from respective directions around the subject to reconstruct a tomographic image (see Patent Literature 1). The X-ray CT device is characterized by being able to capture such a three-dimensional structure of the subject, and therefore, in recent years, has been used not only for observation but for three-dimensional shape measurement.

A tomographic image is reconstructed by back projecting projection images on the basis of geometric information on an X-ray focal point, a subject, and a detector at the time of a CT scan. For this reason, in an X-ray CT device for three-dimensional shape measurement, an error occurring in the geometric information causes spatial distortion in the reconstructed image, causing a reduction in dimensional measurement accuracy. In particular, the X-ray focal point is constantly varied due to some causes such as thermal expansion of an X-ray tube and deterioration of a target during X-ray irradiation. For example, if the X-ray focal point is varied by 10 μm, an error of 1 mm appears in a 100-times enlarged projection image detected by the X-ray detector. In order to reconstruct a tomographic image of a subject without spatial distortion in such a manner as to be able to achieve the dimensional measurement accuracy to be satisfied by the X-ray CT device as one for three-dimensional shape measurement, it is necessary to three-dimensionally detect the position of an X-ray focal point during a CT scan to correct information necessary to reconstruct a tomographic image or suppress a variation in X-ray focal point.

Patent Literatures 2 and 3, and Non-Patent Literature 1 describe techniques for obtaining a two-dimensional focal point movement amount from projection images of a marker as a method for detecting the position of an X-ray focal point during a CT scan. Also, Patent Literature 4 describes a structure for, in order to suppress a reduction in detection accuracy due to the effect of a change in the temperature of a device, containing an X-ray source in a housing and supplying temperature-controlled gas into the housing to thereby cool the heat of the housing including the X-ray source.

CITATION LIST

Patent Literatures

Patent Literature 1: Japanese Unexamined Patent Application Publication No. 2005-351879
Patent Literature 2: International Publication No. 2009/036983
Patent Literature 3: Japanese Patent No. 3743594
Patent Literature 4: Japanese Patent No. 5850059

Non-Patent Literatures

Non-Patent Literature 1: Frederik Vogeler, Wesley Verheecke, Andre Voet, Jean-Pierre Kruth, Wim Dewulf, Positional Stability of 2D X-ray Images for Computer Tomography, International Symposium on Digital Industrial Radiology and Computed Tomography—Mo. 3.3

SUMMARY OF INVENTION

Technical Problem

In the case of position detection of an X-ray focal point described in Patent Literature 2, a projection image of a marker obtained via a detector is large to cause the marker to obstruct an imaging visual field of a subject, and therefore the subject and the marker cannot be simultaneously imaged. For this reason, when scanning the subject, the marker is withdrawn. Also, when imaging the marker, the arrangement of the marker at a reference position has to be reproduced so that the positional relationship between the marker and a detector is constant. For this reason, a highly accurate marker positioning mechanism is required, exerting a heavy load on fabrication.

In the case of position detection of an X-ray focal point described in Non-Patent Literature 1, the position of the X-ray focal point during a CT scan can be constantly detected by, in the vicinity of a rotating stage on which a subject is placed, installing a marker in such a manner as to prevent the obstruction of the visual field of the subject, and simultaneously imaging the marker and the subject. However, the position of the X-ray focal point to be detected is only from two directions on a detector surface.

In the case of position detection of an X-ray focal point described in Patent Literature 3, a projection image of a marker and a subject can be simultaneously taken by pasting the marker on the subject, and the position of the X-ray focal point during a CT scan can be constantly detected. However, the projection image obtained via a detector is one in which the marker is superimposed on the subject, so that the detection accuracy of the marker is reduced and also the marker affects a tomographic image of the subject.

Also, even when temperature on an X-ray source side is controlled to suppress a variation in X-ray focal point, employing a structure for containing an X-ray source in a housing to fix it and further connecting the housing to a cooling device as described in Patent Literature 4 results in an increase in device fabrication cost.

The present invention has been made in order to solve the above-described problems, and intends to provide an X-ray CT device capable of three-dimensionally detecting the position of an X-ray focal point, which varies during a CT scan of a subject, and reconstructing a tomographic image without spatial distortion.

Solution to Problem

A first aspect of the present invention is an X-ray CT device that reconstructs a tomographic image of a subject on a basis of projection data acquired by irradiating the subject with X-rays from multiple angles, and the X-ray CT device includes: an X-ray source that generates an X-ray; an X-ray detector that is arranged opposite to the X-ray source and for detecting an X-ray; a rotating stage that is arranged between the X-ray source and the X-ray detector and for placing the subject; a control device that performs arithmetic processing on a basis of the projection data on the subject, the projection data being detected by the X-ray detector; and a marker member that includes a flat plate provided with markers at at least two positions and a support part supporting the flat plate and is arranged at a position that is between the rotating stage and the X-ray source, allows the markers to be included within a detection range of the X-ray detector during performance of a CT scan, and prevents the flat plate from being superimposed on a projection image of the subject. In addition, the control device includes: a marker feature point detection part that performs image processing on a projection image of the markers to thereby detect feature points that are points at which straight lines through a focal point of the X-ray source and the markers intersect with the X-ray detector, and obtains coordinates of the feature points on a two-dimensional X-ray image; and a focal point movement amount calculation part that, with use of coordinates of the feature points in two different frames, the coordinates being obtained by the marker feature point detection part, three-dimensionally calculates a movement amount of the focal point of the X-ray source between the two different frames, and on the basis of the movement amount of the focal point of the X-ray source, corrects a coordinate system at a time of reconstructing the tomographic image of the subject.

A second aspect of the present invention is the X-ray CT device according to the first aspect, in which the marker member is fixed preventing an installation angle of the flat plate with respect to the X-ray detector from being changed, and the focal point movement amount calculation part three-dimensionally calculates the movement amount of the focal point of the X-ray source with use of installation angle information on the flat plate.

A third aspect of the present invention is the X-ray CT device according to the first aspect, in which the marker member is arranged with the flat plate brought close to an X-ray irradiation port of the X-ray source.

A fourth aspect of the present invention is the X-ray CT device according to the first aspect, in which the marker feature point detection part performs image processing on the projection image of the markers to obtain luminous barycentric points and determines the luminous barycentric points as the coordinates of the feature points.

A fifth aspect of the present invention is the X-ray CT device according to the first aspect, in which the flat plate of the marker member is made of a material that attenuates an X-ray.

A sixth aspect of the present invention is the X-ray CT device according to the fifth aspect, in which the markers are voids provided inside the flat plate or through-holes or concave parts formed in the flat plate.

A seventh aspect of the present invention is the X-ray CT device according to the fifth aspect, in which the markers are columnar-shaped or truncated cone-shaped members that are disposed on a surface of the flat plate and made of a material that attenuates an X-ray.

Advantageous Effects of Invention

According to the first to seventh aspects of the present invention, the X-ray CT device includes the marker member having the flat plate formed with the markers at at least two positions for detecting the position of the X-ray focal point, simultaneously scans the at least two markers without superimposing them on the projection image of the subject, three-dimensionally detects the position of the X-ray focal point during the CT scan, and on the basis of the movement amount of the focal point of the X-ray source, and corrects the coordinate system at the time of reconstructing the tomographic image, and can therefore reconstruct the tomographic image without spatial distortion. For this reason, the X-ray CT device can achieve high dimensional measurement accuracy as a device for three-dimensional shape measurement.

According to the second aspect of the present invention, by fixing the installation angle of the flat plate with respect to the X-ray detector and adding the installation angle as a calculation parameter for the movement amount of the X-ray focal point, the position of the X-ray focal point during the CT scan can be more accurately obtained.

According to the third aspect of the present invention, since the marker member is arranged with the flat plate brought close to the X-ray irradiation port of the X-ray source, the enlargement ratio of the markers on a projection image can be increased. This enables the size of the markers provided on the flat plate to be reduced.

According to the fourth aspect of the present invention, since the luminous barycentric points are determined as the coordinates of the feature points by performing the image processing on the projection image of the markers, the coordinates of the feature points can be accurately determined even when the projection image of the markers is deformed.

According to the fifth to seventh aspects of the present invention, by providing the markers having a thickness different from that of the flat plate, X-ray transmission intensity can be made clearly different between the plate part and marker parts of the flat plate on a projection image to easily perform the detection of the feature points by the image processing.

According to the sixth aspect of the present invention, the markers can be easily formed on the flat plate.

DESCRIPTION OF EMBODIMENTS

Figure 1:
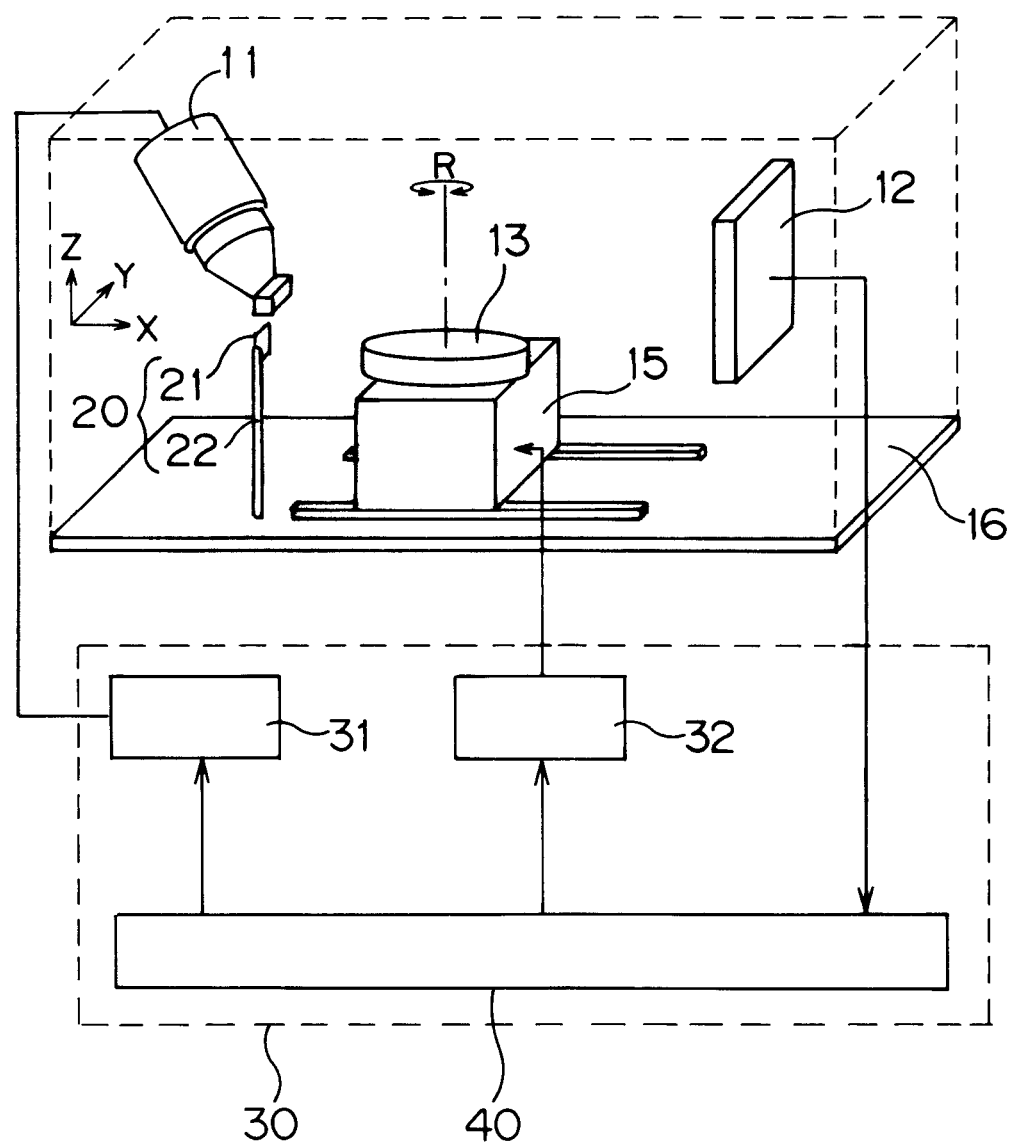
FIG. 1 is a schematic diagram of the X-ray CT device according to the present invention.
Figure 2:
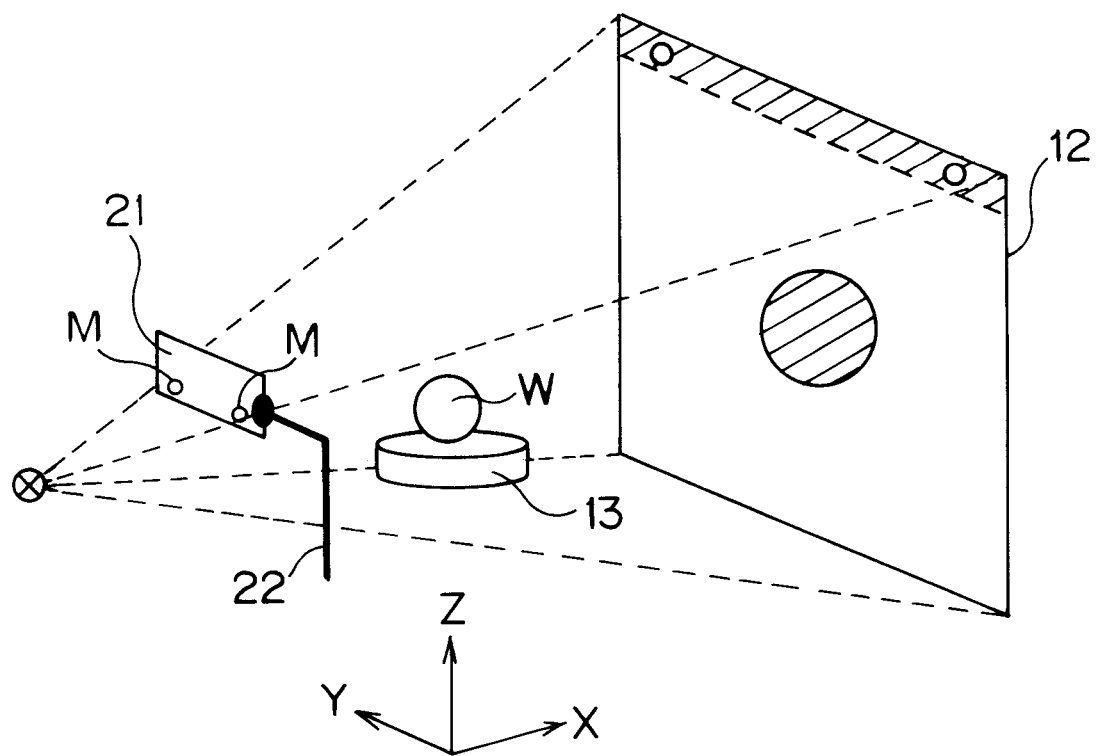
FIG. 2 is a schematic diagram explaining the positions of markers M on the detection surface of an X-ray detector 12.
Figure 3:
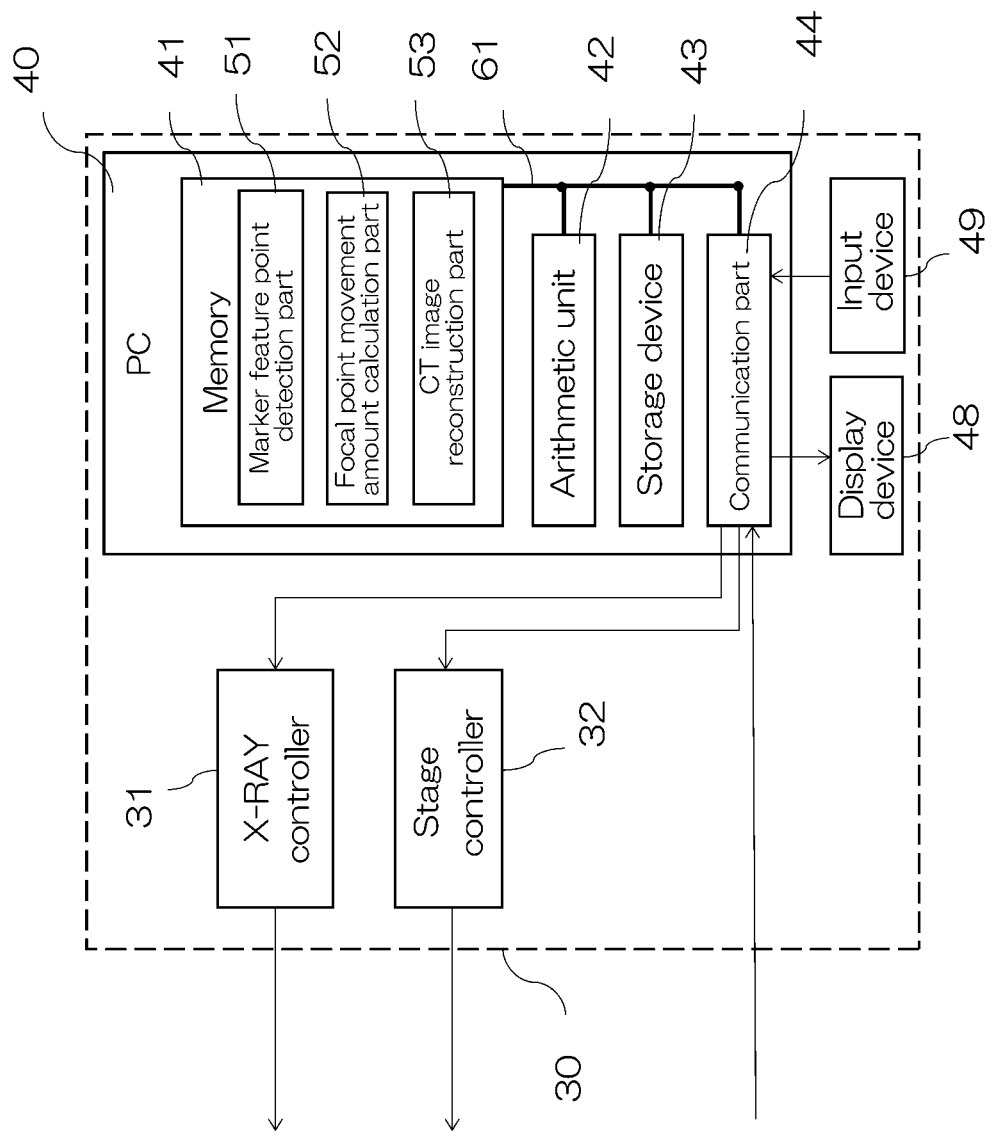
FIG. 3 is a block diagram explaining a main control system of the X-ray CT device according to the present invention.

An embodiment of the present invention will be described with reference to the drawings. FIG. 1 is a schematic diagram of the X-ray CT device according to the present invention. FIG. 2 is a schematic diagram explaining the positions of markers M on the detection surface of an X-ray detector 12. FIG. 3 is a block diagram explaining a main control system of the X-ray CT device according to the present invention.

The X-ray CT device includes: an X-ray source 11 that generates X-rays; the X-ray detector 12 arranged opposite to the X-ray source 11; a rotating stage 13 for placing a subject W; and a control device 30 that controls the whole of the X-ray CT device. The control device 30 is configured to include a personal computer 40, an X-ray controller 31, and a stage controller 32.

The X-ray source 11 and the X-ray detector 12 are fixed to a surface plate 16 by an unillustrated support mechanism. Between the X-ray source 11 and the X-ray detector 12, the rotating stage 13 that rotates around a rotational axis R is arranged. The rotating stage 13 is moved in a direction along an X-ray optical axis on the surface plate 16 by a stage moving mechanism 15. By changing the distance between the rotating stage 13 and the X-ray source 11 by the stage moving mechanism 15, the enlargement ratio of a projection image of the subject W detected by the X-ray detector 12 is changed. Note that in this specification, as illustrated in FIG. 2, an X-axis corresponds to the horizontal direction along the X-ray optical axis, a Z-axis to the up-down (vertical) direction, and a Y-axis to a direction orthogonal to the X-axis and the Z-axis.

The X-ray source 11 has an X-ray tube that conically irradiates the subject W with X-rays toward the X-ray detector 12. Depending on the material and X-ray transmission properties of the subject W, tube voltage and tube current to be supplied to the X-ray tube are controlled by the X-ray controller 31. The X-ray controller 31 is under control of the personal computer 40. A transmitted X-ray image detected by the X-ray detector 12 is taken into the personal computer 40. In the personal computer 40, a tomographic image that is a slice image along a surface parallel to the X-Y plane orthogonal to the rotational axis R is constructed by a CT image reconstruction part 53 (see FIG. 3).

The rotating stage 13 and the stage moving mechanism 15 respectively have independent driving motors, and the driving motors are controlled by drive signals supplied from the stage controller 32. The stage controller 32 is under control of the personal computer 40.

Also, between the X-ray source 11 and the rotating stage 13, a marker member 20 including a flat plate 21 formed with the markers M and a support part 22 supporting the flat plate 21 is arranged. The marker member 20 is arranged at a position closer to the X-ray source 11 than the rotating stage 13.

The flat plate 21 is formed of a thin plate having a thickness enough to prevent deformation in a state of being supported by the support part 22. In addition, the flat plate 21 is provided with the markers M at two positions. In the present embodiment, the markers M are through-holes drilled at left-right symmetric positions of the flat plate 21 of a rectangular shape. Note that in place of the through-holes, columnar-shaped or truncated cone-shaped members formed of a material that is similar to the material of the flat plate 21 and attenuates X-rays may be disposed on the surface of the flat plate 21 as the markers M. In addition, in terms of shape, the through-holes are not limited to columnar holes but may be tapered holes whose inner surfaces are tilted. Further, not the through-holes but concave parts may be formed on the flat plate 21 as the markers M, and depending on the material of the flat plate 21, voids may be provided inside the flat plate as the markers M. That is, the markers M only have to be ones capable of obtaining contrast with the flat plate 21 on a projection image by having a thickness different from that of the flat plate 21, and the shape of the markers M only have to be one causing a clear difference in X-ray transmission intensity between the plate part and marker parts of the flat plate 21. Also, in the present embodiment, the markers M are provided at the two positions, but the number of markers M may be further increased.

The flat plate 21 is fixed to the support part 22 to prevent a change in installation angle. When irradiating the subject W with X-rays from the focal point of the X-ray source 11 to acquire projection data on the subject W, as illustrated in FIG. 2, the position of marker member 21 is fixed to the side closer to the X-ray source 11 so that the markers M are included within the detection range of the X-ray detector 12. In doing so, the flat plate 21 is fixed at a position close to the front of an X-ray irradiation port of the X-ray source 11. In addition, as illustrated in FIG. 2, the length of the support part 22 determining the position of the flat plate 21 is set to a length so that a projection image of the flat plate 21 including the markers M is positioned at a side end of the detection range of the X-ray detector 12 where the projection image of the flat plate 21 is not superimposed on a projection image of the subject W. By arranging the marker member 20 to the surface plate 16 via the support part 22 as described, the flat plate 21 formed with the markers M can be fixed at the fixed position independently of a casing of the X-ray source 11.

Regarding the formation positions of the markers M on the flat plate 21, by increasing the separation distance between the markers M within a range where both of the markers M are not superimposed on the projection image of the subject W, the calculation accuracy of the below-described three-dimensional movement amount of the X-ray focal point is improved.

X-rays transmitted through the flat plate 21 and the subject W on the rotating stage 13 after conical irradiation from the X-ray focal point are detected by the X-ray detector 12 and the resulting detection data is inputted to the personal computer 40.

The personal computer 40 includes: a memory 41 including a RAM, a ROM, and the like; an arithmetic unit 42 that performs various types of arithmetic processing, such as a CPU; a storage device 43 that stores projection data acquired as a result of a CT scan, such as an HDD; and a communication part 44 for transmitting control signals to the X-ray controller 31 and the stage controller 32. The memory 41, the arithmetic unit 42, the storage device 43, and the communication part 44 are connected via an internal bus enabling mutual data communication. The memory 41 stores a program for operating the arithmetic unit 42 to implement functions. In FIG. 3, the program installed in the personal computer 40 is illustrated as a functional block. In the present embodiment, the functional block includes a marker feature point detection part 51, a focal point movement amount calculation part 52, and the CT image reconstruction part 53. Also, the personal computer 40 is connected via the communication part 44 with a display device 48 that displays a tomographic image constructed by the operation of the arithmetic unit 42, or the like, and an input device 49 including a mouse, a keyboard, and the like for giving various instructions to the device.

Figure 4:
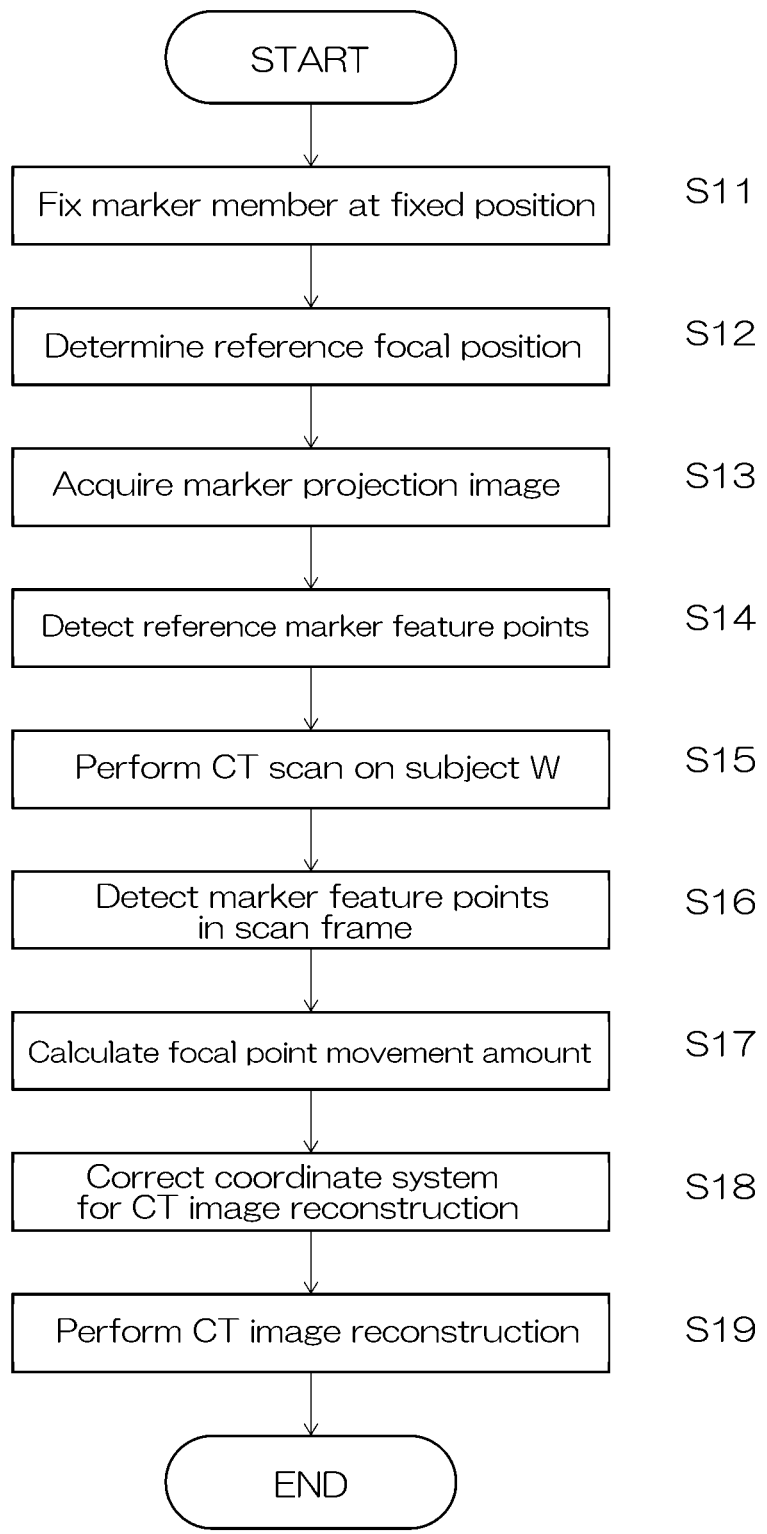
FIG. 4 is a flowchart illustrating a process from acquisition of a projection image of the markers M to CT image reconstruction.

Next, a procedure for detecting the position of the X-ray focal point during the CT scan when the X-ray CT device having the above-described configuration performs the CT scan will be described. A tomographic image is reconstructed by back projecting projection images on the basis of pieces of geometric information including a positional relationship among the X-ray focal point, the subject W, and the detector at the time of the CT scan. Accordingly, the present invention is adapted to track the positional movement of the X-ray focal point, which is one of the pieces of geometric information necessary to reconstruct the tomographic image, and reflect the resulting movement amount in the reconstruction of the tomographic image. FIG. 4 is a flowchart illustrating a process from acquisition of a projection image of the markers M to CT image reconstruction.

First, the marker member 20 is fixed to the surface plate 16 so that the flat plate 21 formed with the markers M is arranged just before the X-ray irradiation port of the X-ray source 11 (Step S11). At this time, the marker member 20 is fixed in such a manner as to parallelize the detection surface of the X-ray detector 12 and the plate surfaces of the flat plate 21. In doing so, the positions of the markers M and the installation angle of the flat plate 21 with respect to the detection surface of the X-ray detector 12 are fixed. Then, an X-ray focal position (reference focal position) serving as a reference for the X-ray focal point is determined (Step S12). Note that the X-ray focal position refers to a position where thermal electrons collide with a target to generate X-rays in the X-ray tube of the X-ray source 11, and is regarded as one point in this specification.

The projection image of the markers M at the reference focal position is acquired (Step S13), and from the acquired projection image, the feature points of the markers M are detected (Step S14). That is, before starting the CT scan on the subject W, the positions of the feature points of the markers M (reference marker feature points) at the X-ray focal position serving as a reference before the X-ray tube is thermally deformed are acquired.

The feature points of the markers M are points at which straight lines through the X-ray focal point and the markers M intersect with the detection surface of the X-ray detector 12. Luminance barycentric points on the projection image of the markers M determined by performing image processing on the projection image obtained by the X-ray detector 12 are set as the coordinates of the feature points. Note that the luminance barycentric points on the projection image of the markers M are points on the two-dimensional X-ray image, and the movements of the feature points of the markers M are represented by vectors in u-v plane coordinates corresponding to the detection surface of the X-ray detector 12. Also, by setting the coordinates of the feature points of the markers M to the luminance barycentric points, relationships with X-ray incident angles on the markers M make it possible to accurately obtain the coordinates of the feature points of the markers M even if the markers M of a circular shape formed on the flat plate 21 are deformed to those of an elliptic shape on the projection image.

Subsequently, the scan is performed while simultaneously imaging the subject W and the markers M (Step S15). When performing the CT scan, while performing the X-ray irradiation from the X-ray source 11 and rotating the rotating stage 13 on which the subject W is placed, a projection image inputted from the X-ray detector 12 to the personal computer 40 at intervals of a predetermined rotation angle is stored in the storage device 43 as frame data. Note that the frame data refers to one screen of projection image data, and is stored in the storage device 43 in order of acquisition time.

By performing the image processing on an acquired projection image, the feature points of the markers M are detected (Step S16). During the CT scan, pieces of projection data corresponding to a sampling pitch suitable for the number of views set in a set scan mode are collected. During the scan, the subject W is irradiated with X-rays from multiple angles; however, since the position of the flat plate 21 with respect to the X-ray detector 12 is fixed, a projection image of the markers M is obtained from each frame. When the X-ray focal position is moved due to some causes such as thermal deformation of the X-ray tube along with the progress of the scan, the movement can be observed as the movements of the feature points of the markers M in the u-v plane coordinates corresponding to the detection surface of the X-ray detector 12. By performing the image processing on pieces of frame data, the feature points of the markers M in the two different frames are detected (Step S16). The detection of the feature points of the markers M can be performed on all pieces of frame data, or on pieces of frame data extracted at predetermined intervals. That is, in Step S17 described below, it is only necessary to calculate how fat the feature points of the markers M are moved between two different frames.

In addition, the detection of the feature points of the markers M in Step S14 and Step S16 is performed in such a manner that the arithmetic unit 42 executes a program read from the marker feature point detection part 51 in the memory 41.

From the vectors of the feature points of the markers M obtained in Step S14 when the X-ray focal point is at the reference position, and the vectors of the feature points of the markers M in some frame obtained in Step S16 during the CT scan, how far and in which direction the feature points were moved are obtained (Step S17). In other words, from changes in the coordinate positions of the feature points of the markers M after the elapse of a certain time, how far and in which direction the X-ray focal point was moved within the certain time are calculated. The calculation of the X-ray focal point movement amount is performed in such a manner that the arithmetic unit 42 executes a program read from the focal point movement amount calculation part 52 in the memory 41.

In addition, in the present embodiment, the positions of the feature points of the two markers M are obtained, and from the positional relationship between the two markers M and the movement amounts of the feature points of the respective markers M, the movement of the X-ray focal point in the direction (X direction) along the X-ray optical axis can also be calculated. As described, using the coordinates of the feature points of at least the two markers M detected in two different frames, the movement amount of the X-ray focal points within a corresponding time can be three-dimensionally calculated including a direction of the movement.

In this X-ray CT device, the plate surfaces of the flat plate 21 is installed substantially parallel to the detection surface of the X-ray detector 12 during the CT scan. For this reason, when calculating the movement amount of the X-ray focal point, the movement amount of the X-ray focal point during the CT scan can be calculated without particularly setting installation angle information as a parameter.

Incidentally, when three-dimensionally calculating the movement amount of the X-ray focal point, the installation angle of the flat plate 21 with respect to the detection surface of the X-ray detector 12 can also be added as a parameter. As the installation angle of the flat plate 21 with respect to the detection surface of the X-ray detector 12 is more displaced from the parallel state, larger differences occur in the distances between the respective two markers M and the detection surface of the X-ray detector 12, and an enlargement ratio is made different between both on a projection image. By using the installation angle information preliminarily acquired as a known parameter to detect the spatial movement of the X-ray focal point, the detection accuracy of the movement of the X-ray focal point can be further improved.

The installation angle of the flat plate 21 with respect to the detection surface of the X-ray detector 12 only has to be acquired using a laser displacement meter or the like, for example, when the marker member 20 is fixed to the surface plate 16. In addition, as in this X-ray CT device, in the case where the positions of the X-ray source 11 and X-ray detector 12 are fixed, and the position of the marker member 21 during the CT scan is fixed with respect to the surface plate 16, once the X-ray detector 12 and the marker member 20 are arranged, the installation angle is not changed during the use of the X-ray CT device, and therefore the acquisition of the installation angle information using the laser displacement meter or the like can be completed at one time.

When the movement amount of the X-ray focal point is obtained, a coordinate system for the CT image reconstruction is corrected on the basis of the focal point movement amount (Step S18). The position of the X-ray focal point is one of the pieces of geometric information necessary to reconstruct the tomographic image, and by correcting the coordinate system for the CT image reconstruction on the basis of the focal point movement amount, an error in the geometric information during the CT scan is corrected. After that, the CT image reconstruction is performed (Step S19) to reconstruct a tomographic image of the subject W. In addition, the correction of the coordinate system for the CT image reconstruction (Step S18) and the performance of the CT image reconstruction (Step 19) are achieved in such a manner that the arithmetic unit 42 executes a program read from the CT image reconstruction part 53 in the memory 41.

As described above, the X-ray CT device of the present invention three-dimensionally detects the position of the X-ray focal point during the CT scan by performing the CT scan while simultaneously imaging at least the two markers M together with the subject W and detecting the feature points of the markers M along the same time axis as that for projection data on the subject W. This enables the movement of the X-ray focal point during the CT scan to be reflected in the reconstruction of the tomographic image, and therefore the tomographic image can be reconstructed without spatial distortion. Accordingly, the X-ray CT device of the present invention can also be used for three-dimensional shape measurement requiring high dimensional measurement accuracy.

REFERENCE SIGNS LIST

11: X-ray source
12: X-ray detector
13: Rotating stage
15: Stage moving mechanism
16: Surface plate
20: Marker member
21: Flat plate
22: Support part
30: Control device
31: X-ray controller
32: Stage controller
40: Personal computer
41: Memory
42: Arithmetic unit
43: Storage device
44: Communication part
48: Display device
49: Input device
51: Marker feature point detection part
52: Focal point movement amount calculation part
53: CT image reconstruction part
M: Marker
W: Subject

The invention claimed is:

1. An X-ray CT device that reconstructs a tomographic image of a subject on a basis of projection data acquired by irradiating the subject with X-rays from multiple angles, the X-ray CT device comprising:
   an X-ray source configured to generate an X-ray;
   an X-ray detector that is arranged opposite to the X-ray source and configured to detect an X-ray;
   a stage that is arranged between the X-ray source and the X-ray detector and for placing the subject;
   a control device configured to perform arithmetic processing on a basis of the projection data on the subject, the projection data being detected by the X-ray detector; and
   a marker member that includes a flat plate provided with at least two markers and a support part supporting the flat plate, the marker member being arranged at a position that is between the stage and the X-ray source, wherein the support part is configured to allow the at least two markers to be included within a detection range of the X-ray detector during performance of a CT scan, and prevent the flat plate from being superimposed on a projection image of the subject,
   wherein the control device comprises:
       a marker feature point detection part configured to perform, for at least two different frames, image prcessing on a projection image of the at least two markers to thereby detect feature points of the at least two markers that are points at which straight lines through a focal point of the X-ray source and the at least two markers intersect with the X-ray detector, and obtain, for the at least two different frames, coordinatoes of the feature points on a two-dimensional X-ray image; and
       a focal point movement amount calculation part configured to:
           with use of the coordinates of the feature points in the at least two different frames, three-dimensionally calculate a movement amount of the focal point of the X-ray source between the at least two different frames, and
           on the basis of the movement amount of the focal point of the X-ray source, correct a coordinate system at a time of reconstructing the tomographic image of the subject.

2. The X-ray CT device according to claim 1,
   wherein the marker member is fixed preventing an installation angle of the flat plate with respect to the X-ray detector from being changed, and
   wherein the focal point movement amount calculation part is configured to three-dimensionally calculate the movement amount of the focal point of the X-ray source with use of installation angle information on the flat plate.

3. The X-ray CT device according to claim 2,
   wherein an installation angle of the flat plate with respect to a detection surface of the X-ray detector is displaced from a parallel state so as to occur larger differences in distances between the respective markers and the detection surface of the X-ray detector, and
   wherein an enlargement ratio of the respective markers is different between both on a projection image in the X-ray detector.

4. The X-ray CT device according to claim 1, wherein the marker member is arranged with the flat plate brought close to an X-ray irradiation port of the X-ray source.

5. The X-ray CT device according to claim 1, wherein the marker feature point detection part is configured to perform the image processing on the projection image of the at least two markers to obtain luminous barycentric points and determine the luminous barycentric points as the coordinates of the feature points.

6. The X-ray CT device according to claim 1, wherein the flat plate of the marker member is made of a material that attenuates an X-ray.

7. The X-ray CT device according to claim 6, wherein the at least two markers are voids provided inside the flat plate or through-holes or concave parts formed in the flat plate.

8. The X-ray CT device according to claim 6, wherein the at least two markers are columnar-shaped or truncated cone-shaped members that are disposed on a surface of the flat plate and made of a material that attenuates an X-ray.

9. The X-ray CT device according to claim 6, wherein the at least two markers are tapered holes, whose inner surfaces are tilted, provided in the flat plate.

10. The X-ray CT device according to claim 1, wherein the focal point movement amount calculation part is configured to three-dimensionally calculate the movement amount of the focal point of the X-ray source during the performance of the CT scan with use of coordinates of the feature points when an X-ray focal point is at a reference position, and coordinates of the feature points during the performance of the CT scan.

11. The X-ray CT device according to claim 1, wherein the focal point movement amount calculation part is configured to calculate a movement amount of the focal point of the X-ray source in a direction along an X-ray optical axis from a positional relationship between the respective markers and movement amounts of the feature points.

12. The X-ray CT device according to claim 1, wherein the flat plate is fixed at a fixed position independently of a casing of the X-ray source.

13. The X-ray CT device according to claim 1, further comprises:
a surface plate,
wherein the marker member is fixed to the surface plate.

14. The X-ray CT device according to claim 1, further comprises:
a surface plate,
wherein the X-ray detector and the marker member are fixed to the surface plate.

15. The X-ray CT device according to claim 1, wherein a length of the support part is a length so that a projection image of the flat plate including the at least two markers is positioned at a side end of the detection range of the X-ray detector where the projection image of the flat plate is not superimposed on the projection image of the subject.

* * * * *